(Model.)
H. M. CARLSEN.
BINDING POLE AND CHAIN.
No. 276,351. Patented Apr. 24, 1883.
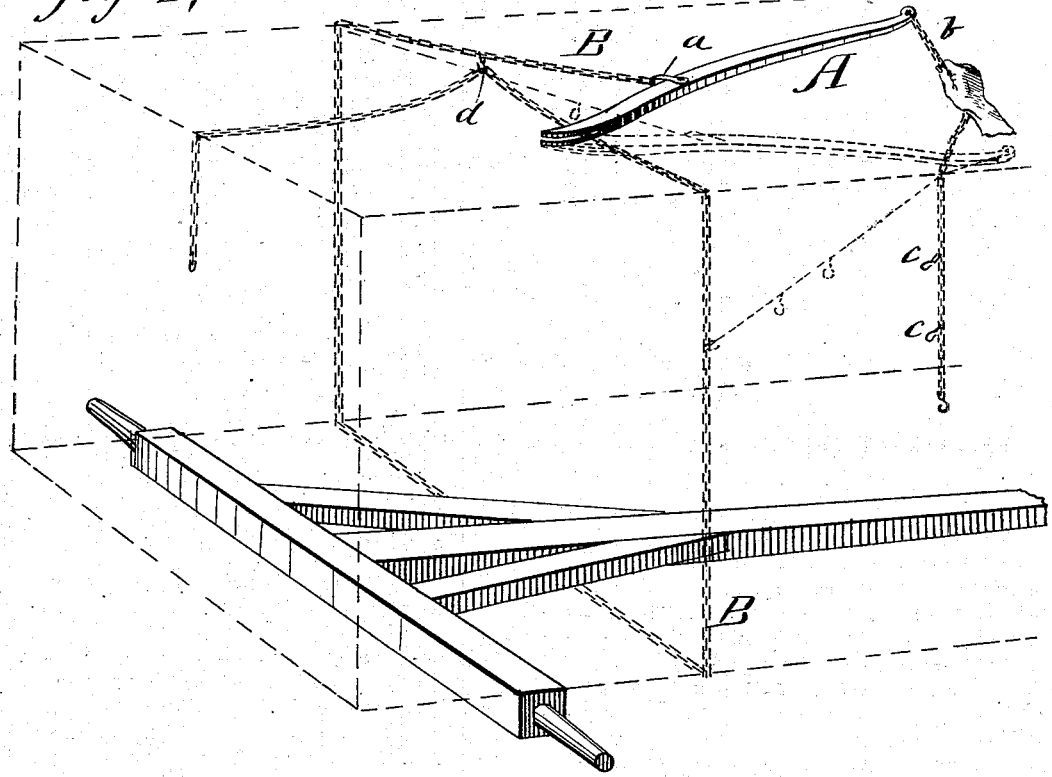
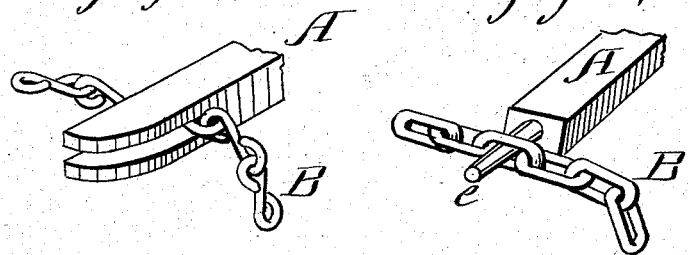
WITNESSES:
Chas. J. Howell,
C. Sedgwick
INVENTOR:
H. M. Carlsen
BY Munn & Co
ATTORNEYS.

UNITED STATES PATENT OFFICE.

HANS M. CARLSEN, OF CLEVELAND, OHIO.

BINDING POLE AND CHAIN.

SPECIFICATION forming part of Letters Patent No. 276,351, dated April 24, 1883.

Application filed February 6, 1883. (Model.)

*To all whom it may concern:*

Be it known that I, HANS M. CARLSEN, of Cleveland, in the county of Cuyahoga and State of Ohio, have invented a new and Improved Binding Pole and Chain, of which the following is a full, clear, and exact description.

My invention relates to binding or straining poles and chains used on wagons for securing the load in place.

The object of the invention is to provide a simple and efficient substitute for the devices generally employed, which are not only cumbersome, but are dangerous to life and limb.

Reference is to be had to the accompanying drawings, forming part of this specification, in which similar letters of reference indicate corresponding parts in all the figures.

Figure 1 is a perspective view illustrating the application of my invention to a wagon and load, and Figs. 2 and 3 are detail views.

The lever or pole A is of suitable length, and may be straight or curved. At a point near what is the fulcrum end of the lever is attached a clevis or shackle, $a$, and to this clevis is connected a chain, B, of suitable length for passing around the load. To the handle end of the lever A a rope or chain, $b$, is connected, and hooks $c$ $c$ are connected on this chain. On the straining-chain B a hook, $d$, is hung a short distance from the lever A. When the chain B is made of flat links the fulcrum end of lever A is to be provided with a pin, $e$, Fig. 3, for engaging the links; but with twisted links the end of the lever will be forked or slotted, as shown in Fig. 2, for passing upon the chain.

The wagon being loaded with lumber, barrels, or other articles that require to be bound tightly for holding them in place, the chain B is thrown around the load, and the hook $d$ then caught after the chain has been drawn as tightly as may be by hand. The shorter or fulcrum end of the lever is then engaged with the chain, as illustrated in Fig. 1, and the chain $b$ then drawn upon until the chain B is strained sufficiently tight. One of the hooks $c$ is then to be caught on the chain or other suitable place for holding the lever, and hook $d$ shifted to take up the slack, so that the chain and load are held by both the hook and the lever.

The lever may be applied in any position at the top or at the side of the load, as most convenient. In case the lever should break under the strain, the hook will hold the chain fast, so that the chain and lever will not be thrown off by the reaction, thus saving all damage and liability of injury to persons.

Having thus described my invention, what I claim as new, and desire to secure by Letters Patent, is—

The combination of lever A, chain B, hook $d$, rope or chain $b$, and hooks $c$, substantially as shown and described.

HANS MARTIN CARLSEN.

Witnesses:
CHRISTIAN JOHNSON,
THOS. ROBINSON.